United States Patent [19]

Fickler

[11] Patent Number: 4,703,666
[45] Date of Patent: Nov. 3, 1987

[54] LINEAR DRIVE DEVICE

[75] Inventor: Hans Fickler, Wiesendangen, Switzerland

[73] Assignee: Lars International S.A., Luxembourg, Luxembourg

[21] Appl. No.: 862,500

[22] PCT Filed: Jul. 10, 1985

[86] PCT No.: PCT/CH85/00112
§ 371 Date: Apr. 23, 1986
§ 102(e) Date: Apr. 23, 1986

[87] PCT Pub. No.: WO86/01573
PCT Pub. Date: Mar. 13, 1986

[30] Foreign Application Priority Data

Aug. 24, 1984 [CH] Switzerland ................ 04050/84

[51] Int. Cl.$^4$ ............................................. F16H 29/02
[52] U.S. Cl. ................................ 74/89.15; 74/424.8 R; 74/661; 74/841; 464/79
[58] Field of Search ........... 74/424.8 R, 89.15, 841, 74/665 A, 661; 464/79, 80

[56] References Cited

U.S. PATENT DOCUMENTS

| | | | |
|---|---|---|---|
| 2,481,477 | 9/1949 | Peery | 74/625 X |
| 2,630,022 | 3/1953 | Terdina | 74/424.8 B |
| 2,882,503 | 4/1959 | Huff et al. | 464/79 X |
| 3,202,009 | 8/1965 | Geyer | 74/424.8 R |
| 4,373,404 | 2/1983 | Heinz | 74/424.8 R X |

FOREIGN PATENT DOCUMENTS

| | | |
|---|---|---|
| 2394724 | 1/1979 | France .................. 74/424.8 R |
| 495517 | 10/1970 | Switzerland . |
| 1266132 | 3/1972 | United Kingdom . |
| 2105622 | 3/1983 | United Kingdom . |

Primary Examiner—Philip C. Kannan
Attorney, Agent, or Firm—Walter C. Farley

[57] ABSTRACT

The linear drive device has two motors ($M_1$, $M_2$) firmly arranged relative to each other, one driving the nut (10), the other driving the screw spindle (20), whereby the nut (10) driven by motor ($M_1$) is mounted axially firmly relative to the motor ($M_1$), whereas the screw spindle (20) is driven by motor ($M_2$) through the intermediate of a non-rotating, but axially shiftable coupling element (21).

6 Claims, 4 Drawing Figures

LINEAR DRIVE DEVICE

BACKGROUND AND SUMMARY OF INVENTION

The invention relates to a linear drive device with two motors firmly arranged relative to each other, one driving a nut, the other driving a screw spindle. Such drive devices with two firmly arranged motors are known from Swiss Pat. No. 647,305. In these known drive devices the screw spindle is always arranged rotatably, but axially fixed, whereas the axial displacement movement of the nut is led to the exterior of the device. This type of construction has been chosen in order to obtain a favorable relationship between the maximum stroke and overall length.

If such a linear drive device is designed to perform fast movements with a small stroke, which can be achieved by electronic control of the motors, the mass to be moved is important. According to the invention the moving mass can be reduced by holding the motor-driven nut axially firmly, whereas the other motor drives the screw spindle by means of a non-rotatable but axially movable coupling element.

It is advantageous to use in a drive device with a small stroke a coupling element having a rigid driving part and a membrane serving as power take-off part connected therewith. By means of such a coupling element, which allows but only a small stroke, the axially moving mass is further reduced because only the membrane is deformed.

BRIEF DESCRIPTION OF THE DRAWING

In the drawing a few embodiments of the invention are represented simplistically.

DETAILED DESCRIPTION OF THE DRAWING

Figure 1:
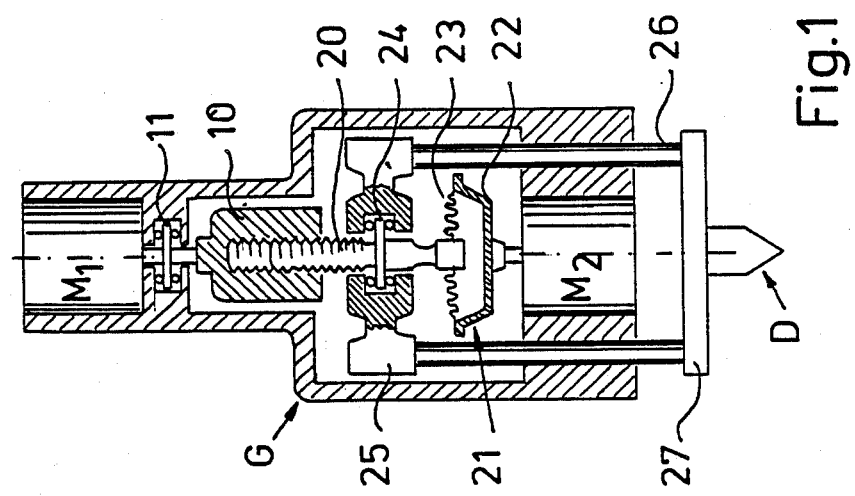
FIG. 1 shows an axial section of a drive device with axially aligned motors.

The linear drive device according to FIG. 1 functions with two motors arranged in a housing G. Motor M1 drives a nut 10, whereas motor M2 drives a screw spindle 20. The nut 10 is axially firmly, but rotatably mounted. To this purpose it is connected firmly with the shaft of motor M1 and additionally supported axially by means of the axial bearing 11.

Motor M2 drives the spindle 20 by means of an axially movable coupling element which is designated with the numerals 21 as a whole.

In the represented embodiment this coupling element consists of a platelike driving part 22 connected with the shaft of motor M2 and an annular, undulated membrane 23 attached at the edge of part 22. The membrane serves as driving part and is provided with a centrally disposed hub which establishes the connection to the screw spindle 20. To the extent of the stroke permitted by the elastic deformation of membrane 23, the spindle 20 is therefore axially movable.

The axial displacement or stroke of the spindle occurs with simultaneous rotation thereof. This movement is led to the exterior of the housing with the aid of an axial bearing 24 in a sled 25 which is axially guided by means of bars connected exteriorly with a traverse 27.

As results from the previously described construction of the drive device the membrane allows only a relatively small stroke of the traverse 27. Of course the stroke could be increased by use of a coupling element with a coupling sleeve and an axially movable core piece therein. However, this would increase the mass of the parts to be moved, which is a disadvantage for rapid reciprocating motions.

The drive device is used namely in a machine tool for movement of a working tool with variable stroke and variable frequence. According to the invention the number of revolutions per time unit is controlled electronically relatively to each other, according to the working pattern.

An important field of use is the superfinish of internal combustion engine pistons which are superfinished according to a certain working pattern. Its originally exclusively cylindrical form is transformed into a slightly embossed and at the same time not circular form. If this superfinish is performed on a lathe, the lathe tool has to be moved to-and-fro at each revolution of the work piece by a small amount.

For such a superfinish the stroke of the lathe tool is 0.1 to 1.0 mm.

The movement, however, must be exactly synchronous to the number of revolutions of the work piece to be finished. Such a superfinishing pattern which is synchronous to the number of revolutions of the work piece may be achieved by electronic control of the number of revolutions of motors M1 and M2 of the drive device. The working pattern may be stored electronically, e.g. on tape or disk. The traverse 27 bears then a diamond charged lathe tool D.

For such a control both motors are operated at the same speed in the same sense of rotation and the electronic control produces a very small change in the number of revolutions of one of the two motors respectively. Depending on the increase or decrease of the speed the traverse 27 is moved either forward or backward.

The drive device with two motors according to the invention has the big advantage over the known drive devices that the full drive force is available at each movement of the traverse, since both motors are operated with almost normal speed and therefore full power.

As the feed should work free from play, but nevertheless with the smallest friction as possible, the nut 10 may consist of a ball rotating nut. The guide bars 26 of the sled may be protected against dust by collars.

Figure 2:
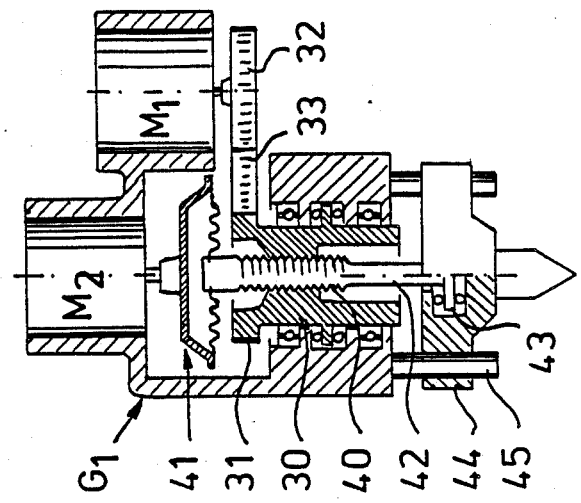
FIG. 2 shows an axial section of a drive device with juxtaposed motors.

Instead of axially aligning the motors as shown in FIG. 1, they may be arranged side by side, as shown in FIG. 2. In this embodiment the nut 30 is mounted axially firmly but rotatable in the housing G and connected with a toothed belt disk 31, allowing motor 1 to drive the nut. Motor M1 is provided to this purpose with a toothed belt disk 32 and drives nut 30 by means of the toothed belt 33.

Motor M2 drives the screw spindle 40 by means of a coupling element 41. The design of the coupling element 41 corresponds to that of the above described coupling element 21. The screw spindle extends with a smooth part of the spindle 42 to the exterior and moves by means of an axial bearing 43 a sled 44 which is guided by the guide bars 45 arranged outside the housing.

Figure 4:
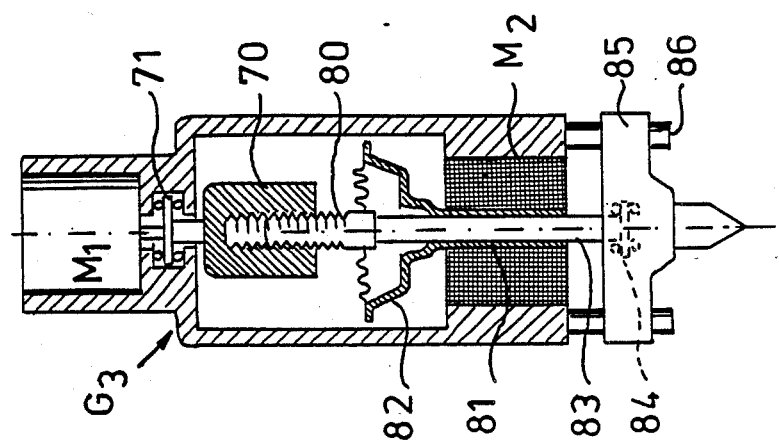
FIGS. 3 and 4 show axial sections of drive devices with axially aligned motors of which one has a hollow shaft.
Figure 3:
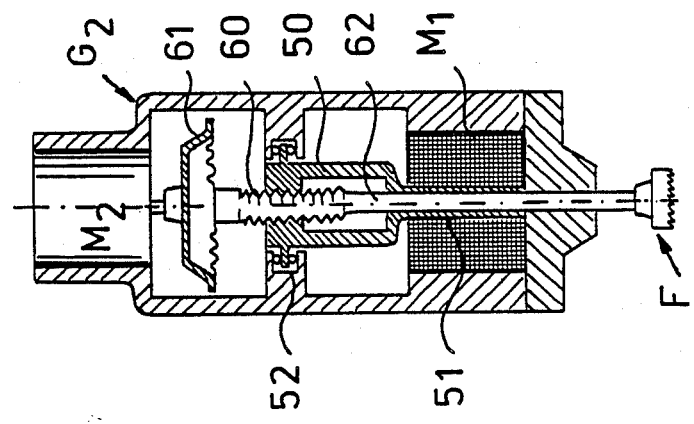

FIGS. 3 and 4 show two further embodiments of the linear drive device in which the smooth part of the spindle extends through the hollow shaft of one of the two motors to the exterior. The cross hatching indicates that the motor is represented in a sectional view.

In the drive device according to FIG. 3 motor M2 drives the screw spindle 60 by means of the coupling 61, said screw spindle having a smooth part 62 extending through the hollow shaft 51 of the motor M2 to the exterior.

Motor M2 drives the nut 50 by means of its hollow shaft 51, said nut being mounted axially firmly but rotatable at 52. In this embodiment a milling head is arranged at the outer end of the spindle as working tool, instead of a lathe tool. This simplifies the construction, because the additional axial bearing of the sled and its guides is made superfluous.

If there is no feed of the milling head, both motors M1 and M2 are rotating at identical speed. An advance or withdrawing of the milling head F is achieved by a slight increase or decrease of the speed of one of the two motors. This means that only with the respective advance or withdrawing of the milling head there is a small rotation of the spindle 62 relatively to the hollow shaft 51.

The drive device according to FIG. 4 differs from that according to FIG. 3 by the fact that in this embodiment motor M2 is driving the spindle 80 by means of a hollow shaft 81 and a coupling element 82. Motor M1 drives the nut 70, which is mounted axially firmly by means of the bearing 71. The smooth part of the spindle 83 extends through the hollow shaft 81 and displaces sled 85 by means of an axial bearing 84 arranged therein. The sled 85 is mounted slidingly on the guide bars 86.

It is clear that the spindle 83 can be provided, as in the drive device according to FIG. 3, with a milling tool instead of moving a sled. The same applies to the drive device according to FIG. 2.

Finally it should be mentioned that all of the represented linear drive devices may be provided with a coupling element with a coupling sleeve containing an axially movable core piece. Such a coupling element allows larger axial displacements compared to a coupling elment with a membrane.

It appears that the double motor design with axially firmly but rotatably mounted nut and axially movable screw spindle is not suitable for linear drive devices with larger stroke, due to the excessive overall length.

I claim:

1. A linear drive device comprising a housing; first and second motors mounted on said housing; an internally threaded nut; first coupling means for coupling the output of said first motor to said nut to rotatably drive said nut; an externally threaded spindle threadedly engaging said nut; second coupling means for coupling the output of said second motor to said spindle for rotatably driving said spindle; means for restraining only one of said nut and spindle against axial movement, the other of said nut and spindle being capable of axial movement; one of said first and second coupling means including a shaft substantially coaxial with said spindle and axially spaced therefrom and a coupling interconnecting said shaft and said axially movable one of said nut and spindle for transferring rotational forces from said shaft to said axially movable one of said nut and spindle while permitting limited axial movement thereof so that the axial position of said movable one of said nut and spindle can be adjusted by controlling the relative rotational speeds of said first and second motors.

2. A drive device according to claim 1 and further a linearly movable means for coupling said axial movement to the exterior of said housing.

3. A drive device according to claim 2 wherein said coupling comprises a generally cup-shaped substantially rigid member fixedly connected to said shaft and an axially flexible membrane attached across said rigid member and connected to an end of said movable one of said nut and spindle.

4. A drive device according to claim 3 wherein said linearly movable means comprises first and second guide bars slidably movable in said housing, a sled rigidly connected to said bars within said housing, thrust bearing means interconnecting said sled and said axially movable one of said nut and spindle, and a tool connected to said bars outside of said housing.

5. A drive device according to claim 4, wherein said motors are coaxially mounted in said housing.

6. A drive device according to claim 4, wherein said motors are mounted so that the output shafts thereof extend along parallel, laterally spaced axes.

* * * * *